Dec. 18, 1956  S. S. STACK  2,774,854
THERMISTOR ASSEMBLY
Filed Aug. 31, 1954
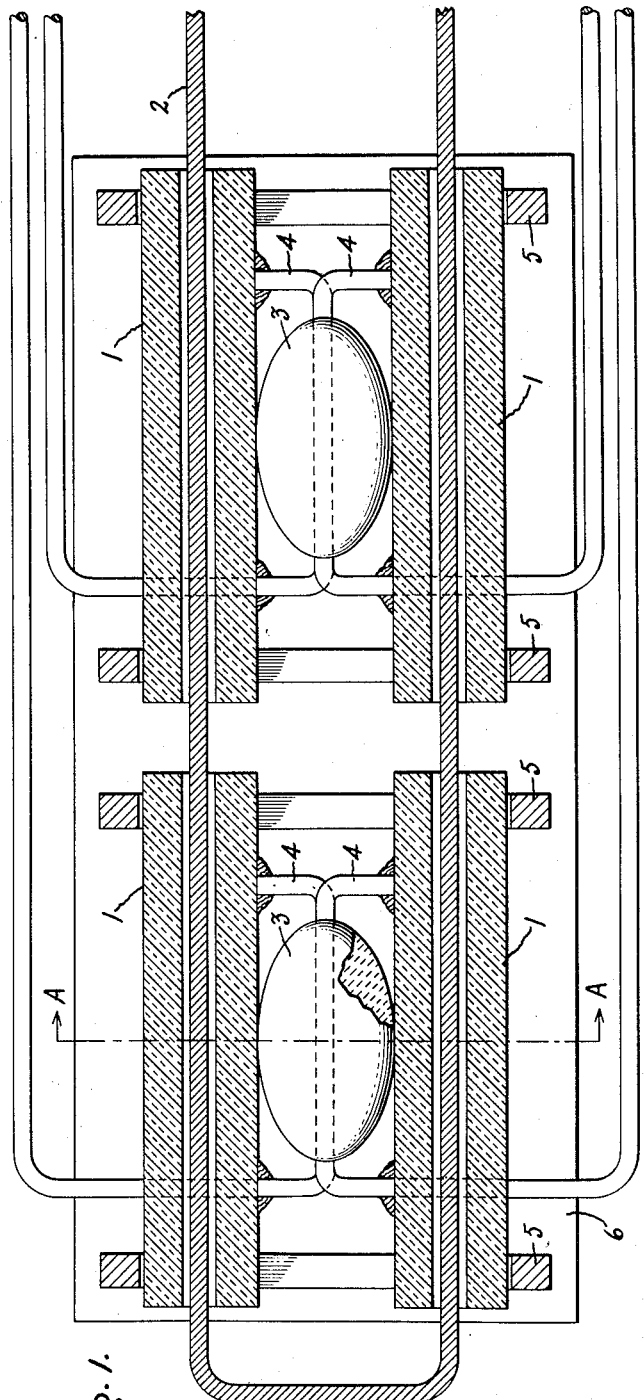
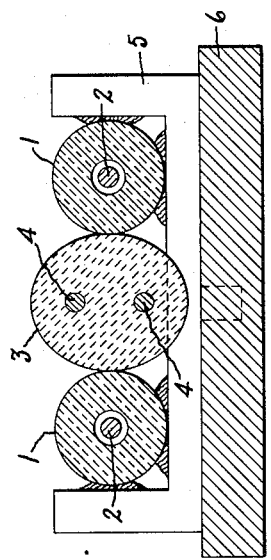
Inventor:
Sydney S. Stack,
by Morton D. Moose
His Attorney.

United States Patent Office

2,774,854
Patented Dec. 18, 1956

2,774,854

THERMISTOR ASSEMBLY

Sydney S. Stack, Schenectady, N. Y., assignor to General Electric Company, a corporation of New York Application August 31, 1954, Serial No. 453,381

10 Claims. (Cl. 201—63)

This invention relates to a thermistor assembly, and more particularly to a thermistor assembly having an extremely fast time response sensitivity.

Thermistors, or thermally sensitive resistors, are devices made of solids whose electrical resistance varies with temperature. They are simple, small, rugged, have a long life and require little maintenance, and their desirable properties have caused them to be widely used. For further details about thermistors and their uses, reference is made to the November 1946 issue of Electrical Engineering, pages 711–725, wherein an article appears entitled, "Properties and uses of Thermistors—thermally sensitive resistors," by J. A. Becker, et al. As is made clear in the aforementioned article, the resistance of a thermistor varies in accordance with the following equation:

$$R_T = A e^{-B/T}$$

where $R_T$ is the specific resistance of the thermistor, $T$ is the thermistor's absolute temperature in degrees Kelvin, $A$ and $B$ are constants for the particular thermistor used, and $e$ is the Naperian logarithm base.

From the foregoing equation, it will be seen that the resistance of a thermistor varies as a function of temperature in an inverse manner: that is to say that as the temperature of a thermistor increases, the resistance of the thermistor will decrease.

This particular characteristic of thermistors has been used in seismographs. A seismograph is an apparatus for recording the time, direction, and intensity of earth tremors. These instruments may be used to prospect for oil, and are well known in the art. Dynamite charges are exploded in the earth and the earth tremors are electronically amplified and recorded on a seismograph, possible oil bearing strata being detected by the fact that they have a particular characteristic vibration. The problem in such instruments is that they are so sensitive that a strong initial tremor will put them out of commission, thus making it impossible to record the weak tremors, emanating from far underground. These latter tremors occur so soon after the initial tremor that it is impossible to disconnect the instrument manually during the initial tremor and reconnect it for the after following tremors. Thermistors have been used in the past in seismographs to electrically dampen the response of the instruments during the large initial earth tremor. This is accomplished by varying the temperature of the thermistor in accordance with the magnitude of the received earth tremor, thereby causing the thermistor to have a decreased resistance during large tremors and an increased resistance during small tremors. The thermistor is placed across the electrical input to the seismograph indicator, and serves to shunt away more of the input signal when its resistance decreases than it will when its resistance increases.

While many uses such as the foregoing have been found for thermistors, some difficulty in making effective use of the properties of the thermistors is encountered where the thermistor resistance must vary in a matter of milliseconds from one value to another. Previously known thermistors were comparatively large and had a slow response, resulting in the loss of desired, small, delayed signals. Further, these thermistors themselves did not have a good enough stability at any given temperature so that an accurate comparative record of the input to the thermistor could be made. Moreover, these thermistors were sensitive to thermal transients which mechanically distorted them, materally shortening their useful life.

It is, therefore, one object of this invention to provide a thermistor assembly which will have an extremely fast time response sensitivity.

It is another object of this invention to provide a thermistor assembly which will have good temperature-resistance stability.

It is a further object of this invention to provide a thermistor assembly which is not sensitive to thermal transients and is mechanically strong.

Other objects and advantages will appear as the description of the invention proceeds.

In accordance with the invention, a thermistor assembly is disclosed which includes a pair of heat conductive elements, such as quartz crystal tubes, having a heater wire freely passing therethrough. Disposed between and supported by the heat conductive elements is an extremely small thermistor element having a pair of leads therein lying in a plane at right angles to the plane in which the heat conductive elements lie. The heat conductive elements have at their ends a pair of supports with slots therein for these elements, the slots in the supports having a length such that the heat conductive elements are at the slot extremities when the thermistor element is placed between the heat conductive elements. The slotted supports make it possible to accurately and easily assemble the extremely small elements involved in this invention. The supports for the heat conductive elements are themselves heat conductive and imbedded in a heat conductive plate so as to obtain good temperature stability and avoid thermal transients. By maintaining the plane of the leads from the thermistor element at right angles with that of the heater wire, the rate of heat transfer from each heat conductive element to the leads is equalized, thus rendering the thermistor free from any uneven heating. By freely passing the heater wires through the heat conductive elements, they are free to expand inside of these elements without causing any thermal strains, thereby eliminating another source of error. Also, a plurality of the above noted thermistor assemblies can be connected together merely by passing a common heater wire through all of the heat conductive elements and providing a common base plate.

The features of the invention which are believed to be novel and patentable are pointed out in the claims which form a part of this specification; for better understanding of the invention, reference is made in the following description to the accompanying drawing, wherein like parts are indicated by like reference numerals, in which:

Fig. 1 is a view of the thermistor assembly of the invention, partially in cross section and partially in elevation; and Fig. 2 is a cross-sectional view taken along line A—A of Fig. 1.

Referring now to Fig. 1, there are shown four heat conductive elements 1, which may be quartz tubes. Quartz is preferred since it has a low thermal coefficient of expansion, thus minimizing any strain due to heating the assembly. Within quartz tubes 1 is disposed a heater filament 2, which runs through the centers of these tubes in the manner shown, and which may be made of Nichrome. The quartz tubes 1 are arranged in parallel pairs to cancel out inductive effects, and contactably disposed between each pair are extremely small thermistors 3. The thermistors are as small as possible in order to obtain the fastest possible response. Each thermistor has within it a pair of electrically conductive leads 4, and each pair of leads have their one ends cut off, turned, and glued to quartz tubes 1, while their other ends pass behind quartz tubes 1, being glued to these tubes at the point where they pass them. The glued connections serve to partially support the thermistor elements, while the contacts of the thermistor elements with the quartz tubes serves a supporting as well as a heating function. Leads 4 are disposed in a plane at right angles with that of heater elements 1 and 2.

Referring now to Fig. 2, it will there be more clearly seen that quartz tubes 1 are disposed within slotted conductive support elements 5 and glued thereto, the slots in these elements being sufficiently long enough so that the quartz tubes 1 are substantially at the extremities of the slots when thermistors 3 are disposed between the quartz tubes. It will also be seen in this figure that supports 5 are mounted within a conductive base plate 6, which serves to equalize the temperatures throughout all of the supports.

By maintaining the plane of the leads 4 within thermistors 3 at right angles to the plane of conductive elements 1 and 2, the rate of heat transfer from each heater to the thermistors is equalized, since each lead is always the same distance from any given heater as its companion lead. Further, since the heater wire 2 is free to move within quartz tubes 1, it can expand within these tubes without causing strains which would damage the thermistor. Moreover, the common conductive base 6 for all of the conductive support elements 5 increases the accuracy of the thermistor assembly by equalizing all temperatures and thereby reducing thermal transients. Also, by making the slots in supports 5 barely large enough to contain quartz tubes 1 and thermistors 3, ease of assembly as well as accurate placement of the extremely small elements involved are promoted. The assembly can easily be constructed merely by placing the quartz tubes 1 at the extremities of the slots in supports 5, gluing them to the supports, and by then placing thermistors 3 between tubes 1. The slots in supports 5 also insure the parallel spacing of tubes 1, thereby cancelling out any inductive effects of heater wire 2.

In operation, an electrical signal is applied across the two ends of heater wire 2, causing quartz tubes 1 to become heated and heat thermistors 3. The greater the electrical signal thus applied, the greater the heat that will be generated by this wire, and the lower the resistance of thermistors 3 will drop. For low electrical input signals applied to wire 2, the resistance of thermistors 3 will rise. It will therefore be apparent that the thermistor assembly shown in the drawings can be used to damp large input electrical signals.

The thermistor assembly shown in the drawing is a greatly expanded view of the actual assembly that was built and tested. In the actual construction, quartz tubes 1 had an outer diameter of 0.0023", thermistors 3 had a smaller diameter equal to 0.003" and a volume that was 1/10 the volume of the smallest thermistors previously employed, and the slots in supports 5 had a length of 0.008". By means of this construction, an extremely sensitive thermistor assembly was obtained having a 30 to 1 change in resistance for a 1/10 watt heater dissipation, and with a time constant of about 40 milliseconds, time constant being defined as the time required for the thermistor to reach 3.2% of its final temperature change.

It should be understood that any number of such thermistor assemblies can be connected together by merely using a common heater wire tube looped through their respective quartz tubes 1, and that this invention is not limited to the two element assembly shown in Fig. 1.

While there has been described what is at present considered a preferred embodiment of the invention, it will be obvious to those skilled in the art that various changes and modifications may be made therein, without departing from this invention; and it is aimed in the appended claims to cover all such changes and modifications as fall within the true spirit and scope of the invention.

What I claim as new and desire to secure by Letters Patent of the United States is:

1. A thermistor assembly, comprising at least one pair of heat conductive elements, and at least one thermistor element contactably disposed in heat exchange relationship between said heat conductive elements and supported thereby.

2. A thermistor assembly, comprising at least one pair of heat conductive elements, at least one thermistor element contactably disposed in heat exchange relationship between said heat conductive elements and supported thereby, and a pair of leads passing through said thermistor and lying in a plane at right angles to the plane in which said heat conductive elements lie.

3. A thermistor assembly, comprising at least one pair of heat conductive elements, at least one pair of heat conductive supports at the ends of said heat conductive elements and having slots therein in which said heat conductive elements are disposed, and at least one extremely small thermistor element contactably disposed between said heat conductive elements and supported thereby, the slots in said supports having a length such that said heat conductive elements are at the extremities of the slots when said thermistor element is disposed between them.

4. A thermistor assembly, comprising at least one pair of heat conductive elements, at least one pair of heat conductive supports at the ends of said heat conductive elements and having slots therein in which said heat conductive elements are disposed, at least one extremely small thermistor element contactably disposed between said heat conductive elements and supported thereby, the slots in said supports having a length such that said heat conductive elements are at the extremities of the slots when said thermistor element is disposed between them, and a pair of leads passing through said thermistor and lying in a plane at right angles to the plane in which said heat conductive elements lie.

5. A thermistor assembly, comprising at least one pair of heat conductive tubes, a heater wire freely passing through said heat conductive tubes, and at least one thermistor element contactably disposed in heat exchange relationship between said heat conductive tubes and supported thereby.

6. A thermistor assembly, comprising at least one pair of heat conductive tubes, a heater wire freely passing through said heat conductive tubes, at least one thermistor element contactably disposed between said heat conductive tubes and supported thereby, and a pair of leads passing through said thermistor and lying in a plane at right angles to the plane in which said heat conductive tubes lie.

7. A thermistor assembly, comprising at least one pair of heat conductive tubes, a heater wire freely passing through said heat conductive tubes, at least one pair of heat conductive supports at the ends of said tubes and having slots therein in which said heat conductive tubes are disposed, and at least one extremely small thermistor element contactably disposed between said heat conductive tubes and supported thereby, the slots in said supports having a length such that said heat conductive tubes are at the extremities of the slots when said thermistor element is disposed between them.

8. A thermistor assembly, comprising at least one pair of parallel heat conductive tubes, a heater wire freely passing through said heat conductive tubes, at least one pair of heat conductive supports at the ends of said tubes and having slots therein in which said heat conductive tubes are disposed, at least one extremely small thermistor element contactably disposed between said heat conductive tubes, the slots in said supports having a length such that said heat conductive tubes are at the extremities of the slots when said thermistor is disposed between them, and a pair of leads passing through said thermistor and lying in a plane at right angles to the plane in which said heat conductive tubes lie, said leads being attached to said heat conductive tubes for support thereby.

9. A thermistor assembly, comprising at least one pair of parallel heat conductive tubes, a heater wire freely passing through said heat conductive tubes, at least one pair of heat conductive supports at the ends of said tubes and having slots therein in which said heat conductive tubes are disposed, at least one extremely small thermistor element contactably disposed between said heat conductive tubes and supported thereby, the slots in said supports having a length such that said heat conductive tubes are at the extremities of the slots when said thermistor is disposed between them, a heat conductive base plate upon which said supports are mounted, and a pair of leads passing through said thermistor and lying in a plane at right angles to the plane in which said heat conductive tubes lie, said leads being attached to said heat conductive tubes for support thereby.

10. A thermistor assembly, comprising at least one pair of parallel quartz tubes, a heater wire freely passing through said quartz tubes, at least one pair of heat conductive supports at the ends of said quartz tubes and having slots therein in which said tubes are disposed and attached, at least one extremely small thermistor element contactably disposed between said quartz tubes, the slots in said supports having a length such that said quartz tubes are at the extremities of the slots when said thermistor is disposed between them, a heat conductive base plate upon which said supports are mounted, and a pair of leads passing through said thermistor and lying in a plane at right angles to the plane in which said quartz tubes lie, said leads being attached to said quartz tubes for support thereby.

References Cited in the file of this patent

UNITED STATES PATENTS 2,463,805    Polye et al.  ------------ Mar. 8, 1949